2,948,728

QUINOLINE AND ACRIDINE COMPOUNDS

Bernard Rudner, Pittsburgh, Pa., and Aristotle G. Prapas, Baltimore, Md., assignors to W. R. Grace & Co., New York, N.Y., a corporation of Connecticut No Drawing. Filed Oct. 15, 1958, Ser. No. 767,259

9 Claims. (Cl. 260—279)

This invention relates to quaternary nitrogenous salts. In one specific aspect, it relates to quinoline and acridine compounds containing hydrazinium-alkyl-amino side chains as substituents on the heterocyclic ring.

It is an object of the present invention to provide a new generic class of pharmaceutically useful hydrazinium compounds.

The compounds of this invention are conveniently prepared by the action of chloramine on the appropriate tertiary amine. In the preferred practice of our invention, the reactant tertiary amine dissolved in an unreactive solvent is exposed to a stream of gaseous chloramine. The resultant quinoline or acridine hydrazinium chloride is isolated by conventional laboratory techniques. Compounds containing anions other than chloride are prepared by metathesis starting with the chloride and a compound containing the anion to be introduced.

In accordance with the present invention, we have made available a new class of compounds corresponding to the general formulae:

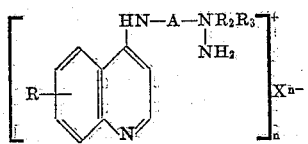

and

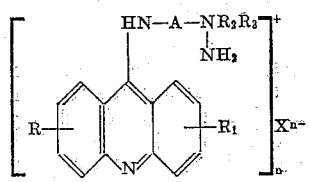

In the above formulae, R and $R_1$ are annular substituents selected from the group consisting of hydrogen, halo and lower alkoxy; $R_2$ and $R_3$ are lower alkyl radicals. A represents a divalent alkylene radical containing 2 to 6 carbon atoms inclusive. X is an anion bearing the charge $n$; $n$ is also the number of cations required to balance the anionic charge.

When our compounds are used for pharmaceutical purposes, X must be a pharmaceutically acceptable anion. The primary attributes of such an anion are nontoxicity and pharmaceutical compatibility. Otherwise, the choice of the anion is of little consequence, since the primary activity of our novel compounds resides in the cation. The salts obtained by variation of the anion may in some cases have special advantages due to solubility, ease of crystallization, lack of objectionable taste and the like, but these considerations are all subsidiary to the characteristics of the cation which are independent of the character of the anion. Hence all variations of X are considered equivalent for the purpose of the present invention. Specific, but non-limiting, variants of X are as follows: chloride, bromide, iodide, sulfate, bisulfate, acetate, salicylate, valerate, oleate, phenate, laurate, borate, benzoate, lactate, nitrate, diglycollate, phosphate, phenylethylbarbiturate, o-acetoxybenzoate, citrate, dialkylbarbiturate, sulfathiazole, theophyllinate, urate, maleate, fularate, succinate, tartrate, diethylbarbiturate, penicillinate, camphorate, salicylamide, diphenylhydantoin, carbonate, cacodylate, aconitate, sulfamate, gentisate, malate and the like.

One method of preparing the novel compounds of our invention is to react chloramine with the tertiary amine corresponding to the desired hydrazinium compound; the product is isolated and purified by standard laboratory techniques. Since many of the amines are commercially available as their salts, the hydrochloride being the most common, it has been found convenient to treat aqueous solutions of the amine salts with base and extract the free amine with a solvent such as chloroform. After treatment of the extract with a conventional drying agent, the solution is ready for chloramination. While chloramine is most advantageously prepared as a gaseous chloramine-ammonia mixture obtained from a generator constructed according to the teachings of Sisler et al., U.S. Patent 2,710,248; other methods are equally adaptable for the purpose of the present invention. For instance, chloramine can be made by reacting chlorine with an excess of ammonia in carbon tetrachloride or similar halogenated hydrocarbon solvents under controlled conditions of mixing at low temperatures. Such a process is fully described in U.S. Patent 2,678,258 to John F. Haller. Another effective procedure is that of Coleman et al. fully described in "Inorganic Synthesis," vol. I, 59 (1939). Alternatively, the chloramine can be formed in the presence of the amine as described in the copending application Serial No. 605,230, filed August 20, 1956, which teaches the reaction of chlorine and a tertiary amine in the presence of excess ammonia. For simplicity, when both the amine and the product are soluble in the same inert solvent, e.g., chloroform, chloramine may be formed in situ by this method right in the solution containing the reactant tertiary amine. In general, the choice of solvent is one of economy and simplicity. When preformed chloramine is used and good absorption is required for efficient reaction, it has been found desirable to bubble chloramine through a long column of a solution comprising the tertiary amine dissolved in relatively cheap inert solvent. By inert solvent it is meant a solvent unreactive under the condition of the reaction. Solvents which serve this purpose include hydrocarbons, e.g., heptane, cyclohexane, benzene, xylene and the like; ethers e.g., diethyl ether, diamyl ether, dioxane and anisole; amides, e.g., dimethylformamide and dimethylacetamide; halohydrocarbons, e.g., chloroform, carbon tetrachloride, trichloroethylene and chlorobenzene; nitroaromatics, e.g., nitrobenzene. For special purposes, water and other hydroxylic solvents such as ethyl alcohol and Cellosolve may be used. When the reaction is conducted in anhydrous solution, the product often precipitates as the reaction progresses. In aqueous solution, however, it is usually necessary to concentrate or to evaporate to dryness in order to isolate the product.

Another method of preparing the novel compounds of our invention is the reaction of hydroxylamine-o-sulfonic acid with tertiary amines which produces the hydrazinium sulfate corresponding to the tertiary amine used. Preferably the appropriate tertiary amine and hydroxylamine-o-sulfonic acid are allowed to react or are heated together in the presence of an alcoholic solvent but excess amine or other suitable solvents may be used. Even though the use of a solvent is not required, superior results are obtained with a solvent because of the extremely exothermic reaction that quite often results. A frequent purification step is the treatment of the reaction mixture with a basic substance such as sodium carbonate to remove acidic constituents from the product hydrazinium sulfate which is essentially neutral and stable to the action of base.

Further purification is effected by standard laboratory techniques.

It is obvious that not all of the novel hydrazinium compounds of our invention are capable of being prepared directly as shown above. In order to provide the other useful salts of the present invention, it is necessary to prepare the compounds containing anions other than chloride or sulfate by metathesis. Many of the anions described supra can be obtained by mixing aqueous solutions of the hydrazinium chloride with appropriate reagents. More often than not, the desired product precipitates directly as the reaction progresses. This is the case where the new salt being formed is less soluble or insoluble in water. Other metathetical approaches are available and the method selected depends on experimental convenience, costs of reagents and the difference in physical properties between the product and the starting material to be utilized in their separation. Reaction of a hydrazinium halide with a soluble silver salt, such as silver nitrate, results in the precipitation of silver halide and the formation of the hydrazinium nitrate. In an analogous manner, treatment of the sulfate with a soluble barium salt results in the precipitation of barium sulfate and conversion to the anion of the barium salt. Quite often the appropriate reactants are heated together in the absence of a solvent and the product isolated by standard laboratory techniques. Another approach independent of the formation of an insoluble solid, is to react the halide with an excess of the desired anion as its acid; hydrogen halide is evolved as the new salt is formed. When it is necessary to prepare a very soluble salt, the reaction of the hydrazinium hydroxide with equivalent amounts of the appropriate acid may be utilized; this approach is also used for the preparation of very pure compounds. (Subjecting a hydrazinium halide to the action of moist silver oxide will give the hydrazinium hydroxide.)

The presence of the hydrazinium function on the molecule does not affect the ability of the other nitrogen functions in the molecule to form salts with mineral acids. In the absence of evidence teaching which is a stronger base here, the side-chain secondary amine or the heterocyclic nitrogen, it is difficult to assign a definitive structural formula to such acid salts. Sometimes the acid salts of our novel hydrazinium compounds are isolated directly being formed during the course of the same reaction that created the hydrazinium linkage. For example, the ammonium chloride present from chloramine formation and/or decomposition may react with the product to form the hydrochloride salt as in Example V. Or by the reaction of hydroxylamine-o-sulfonic acid with the appropriate amines where the adduct is a bisulfate as illustrated:

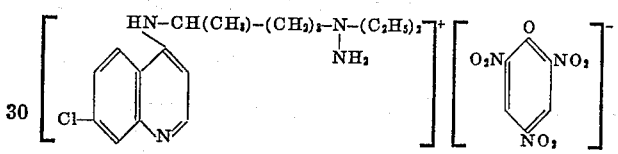

the mineral acid salts come within the scope of our invention as do similar salts, i.e., the hydrobromide, the acid phosphates, etc.

The scope and utility of our invention is further illustrated by the following examples:

Example I

Twenty-five grams of chloroquine diphosphate was dissolved in aqueous sodium hydroxide and the free amine extracted with chloroform. The extract was dried and made up to one liter before treating the amine in solution with an equivalent amount of gaseous chloramine prepared by means of the generator discussed above. Filtration of the reaction mixture yielded 1.2 g. of solid containing about 70% ammonium chloride. The filtrate, a dark oil, was washed with ether and vacuum-dried leaving a hygroscopic light brown powder weighing 7.2 g. Both solids were dissolved in water and brought to a pH of about 8.5 by the addition of sodium hydroxide. The alkaline solution was extracted with xylene till colorless before being evaporated to dryness in vacuo. The insoluble portion of the residue was taken up in chloroform and precipitated by addition of the solution to excess dioxane. The last two steps were repeated twice yielding 1,1-diethyl-1-[4-(7-chloroquinolinyl-4-amino)amyl] hydrazinium chloride as a hydroscopic tan micro-crystalline solid melting 167–168.5° C. with decomposition.

Examples II and III

Separate portions of the chloride of the previous example were dissolved in water and treated with aqueous potassium hexafluorophosphate and with saturated aqueous picric acid. The resultant precipitates were collected by filtration and dried to give the corresponding hexafluorophosphate (M.P. 122–124° C.) and picrate (M.P. 184–187° C.) respectively. The structural formula of the latter is shown below:

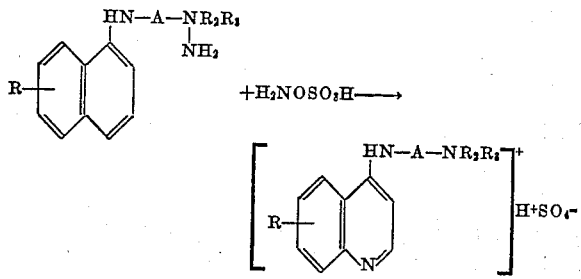

Example IV

An aqueous solution of 3.5 g. of the product of Example I was shaken with the silver oxide freshly prepared from one gram of silver nitrate. After shaking for 45 minutes, the chloride-free solution was separated by decantation. The precipitate was washed with water and the decantates combined. To the aqueous solution of 1,1-diethyl-1-[4-(7-chloroquinolinyl-4-amino)amyl] hydrazinium hydroxide thus obtained, there was added sufficient phosphoric acid to bring the reaction mixture to a pH of 4.5. Evaporation and vacuum drying gave 1,1-diethyl-1 - [4 - (7 - chloroquinolinyl-4-amino)amyl] hydrazinium phosphate as a hydroscopic thick yellow-green oil which decomposed about 186° C.

Example V

Eighty-five grams of quinacrine hydrochloride was treated with aqueous base and the free amine extracted with chloroform. The extract, after drying, was treated with three equivalents of chloramine. Filtration of the reaction mixture gave 23 g. of solid, about 85% of which was ammonium chloride. Most of the product was obtained by evaporation of the filtrate. The 86 g. residue, a tan hydroscopic solid melting 47–55° C., was substantially 1,1-diethyl-1-[4-(3-chloro-7-methoxyacridyl-9-amino)amyl] hydrazinium chloride hydrochloride; it analyzed for 13.8% chloride (theoretical value: 14.1%). After washing with ether, the residue was taken up in chloroform and extracted three times with equal volumes of 5% aqueous sodium hydroxide. The aqueous extract was brought to a pH of 3 with hydrochloric acid and back extracted with chloroform. The dark brown residue obtained on evaporation of the chloroform was dissolved in water and the solution treated with activated charcoal. The residue obtained after evaporating the filtrate was taken up in methyl alcohol and precipitated by the addition of ethyl acetate. The product 1,1-diethyl - 1 - [4 - (3 - chloro - 7 - methoxyacridyl - 9 - amino) amyl] hydrazinium chloride, was an extremely hygroscopic dark brown solid containing 8.3% chloride as calculated by theory. It formed an oily picrate and a water soluble hexafluorophosphate.

Example VI

Sodium citrate (0.6 g.) and the hydrazinium chloride of the previous example (0.5 g.) were intimately mixed and heated at 45–50° C. for 32 hours in vacuo. The reaction mixture was extracted five times with 10 ml. portions of absolute alcohol. Evaporation of the combined extracts yielded about 0.4 g. of an orange precipitate. After washing with chloroform, the product was redissolved in alcohol and precipitated by the addition of ethyl acetate. The hygroscopic, water-soluble product, 1,1 - diethyl - 1 - [4 - (3 - chloro - 7 - methoxyacridyl - 9 - amino)amyl] hydrazinium citrate, was an orange colored solid liquefying about 68° C. and decomposing ca. 145° C.

*Example VII*

Mixing concentrated solutions containing approximately equivalent weights of the hydrazinium chloride of Example V with sodium salicylate gave 1,1-diethyl-1-[4-(3-chloro - 7-methoxyacridyl-9-amino)amyl] hydrazinium salicylate as an insoluble precipitate decomposing about 275° C. Similar treatment with sodium phosphate, dipyrone, potassium penicillin G and sodium nicotinate gave the corresponding water soluble salts. With silver sulfate, there resulted an immediate precipitate of silver chloride. Evaporation of the aqueous layer gave 1,1-diethyl - 1 - [4 - (3 - chloro - 7 - methoxyacridyl - 9 - amino)amyl] hydrazinium sulfate melting and decomposing about 231° C. The product was chloroform insoluble, soluble in water and alcohol and less hygroscopic than the corresponding chloride; it had the following structural formula:

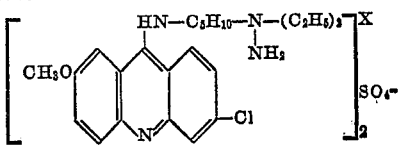

Examples I and V illustrate the difference between the simple salt of a tertiary amine and the corresponding hydrazinium compound (or the acid salts of the hydrazinium compound). When the amine salt is treated with caustic, the water-insoluble amine-base is produced. When the corresponding hydrazinium compound is treated with caustic, it remains soluble and can be recovered unchanged. Hence our novel compounds are useful as water-soluble alkali-stable forms of medicinals. The tertiary amines have recently been found to be promising in the treatment of rheumatism and arthritis. Our novel hydrazinium compounds permit the use of these drugs in alkali media without loss of solubility as in bodily fluids etc. Thus they can be mixed with alkaline analgesics, e.g. dipyrone, or with alkaline anti-bacterials, e.g. sulfa drugs, without the formation of the water insoluble free base such as would characterize simple salts of the corresponding tertiary amine. In addition, the hydrazinium compounds exhibit diminished toxicity.

We claim:
1. Hydrazinium-amino compounds selected from the group consisting of

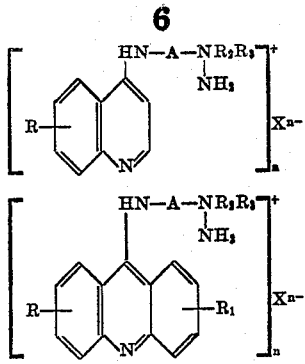

and their non-toxic mineral acid salts wherein R and $R_1$ are substituents selected from the group consisting of hydrogen, halo and lower alkoxy; $R_2$ and $R_3$ are lower alkyl radicals; A is a divalent alkylene radical having 2 to 6 carbon atoms inclusive; X is a pharmaceutically acceptable anion; and $n$ is an integer less than four.

2. Compounds having the formula:

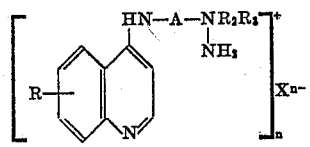

wherein R is halo; $R_2$ and $R_3$ are lower alkyl radicals; A is a divalent alkylene radical having 2 to 6 carbon atoms inclusive; X is a pharmaceutically acceptable anion; and $n$ is an integer less than four.

3. Compounds having the formula:

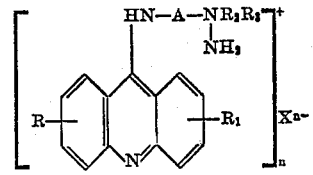

wherein R is lower alkoxy; $R_1$ is halo; $R_2$ and $R_3$ are lower alkyl radicals; A is a divalent alkylene radical having 2 to 6 carbon atoms inclusive; X is a pharmaceutically acceptable anion; and $n$ is an integer less than four.

4. 1,1 - diethyl - 1 - [4 - (7 - chloroquinolinyl - 4 - amino)amyl] hydrazinium chloride.
5. 1,1 - diethyl - 1 - [4 - (7 - chloroquinolinyl - 4 - amino)amyl] hydrazinium phosphate.
6. 1,1 - diethyl - 1 - [4 - (3 - chloro - 7 - methoxy - acridyl-9-amino)amyl] hydrazinium chloride.
7. 1,1 - diethyl - 1 - [4 - (3 - chloro - 7 - methoxyacridyl-9-amino)amyl] hydrazinium chloride hydrochloride.
8. 1,1 - diethyl - 1 - [4 - (3 - chloro - 7 - methoxyacridyl-9-amino)amyl] hydrazinium citrate.
9. 1,1 - diethyl - 1 - [4 - (3 - chloro - 7 - methoxyacridyl-9-amino)amyl] hydrazinium sulfate.

No references cited.

UNITED STATES PATENT OFFICE
CERTIFICATION OF CORRECTION

Patent No. 2,948,728                                    August 9, 1960

Bernard Rudner et al.

It is hereby certified that error appears in the above numbered patent requiring correction and that the said Letters Patent should read as corrected below.

Column 3, lines 53 to 63, the equation containing the structural formulas should appear as shown below instead of as in the patent:

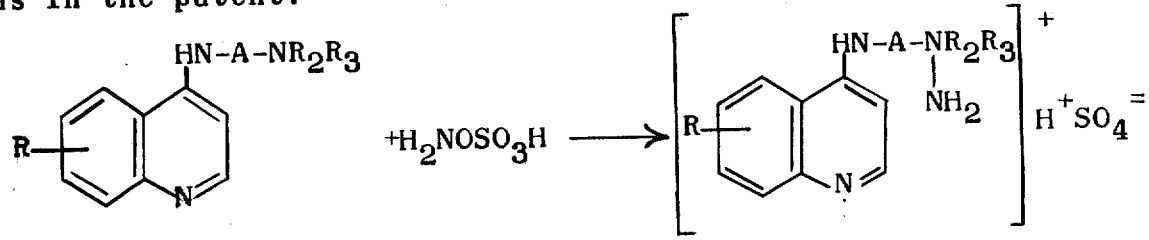

Signed and sealed this 3rd day of April 1962.

(SEAL)
Attest:

ERNEST W. SWIDER                             DAVID L. LADD
Attesting Officer                            Commissioner of Patents